(12) United States Patent
Hirth et al.

(10) Patent No.: US 10,443,467 B2
(45) Date of Patent: Oct. 15, 2019

(54) HONEYCOMB BODY WITH AN ELECTRIC HEATING DEVICE

(71) Applicant: CONTINENTAL AUTOMOTIVE GMBH, Hannover (DE)

(72) Inventors: Peter Hirth, Rösrath (DE); Thomas Härig, Neunkirchen-Seelscheid (DE); Sigrid Limbeck, Much (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/494,611

(22) Filed: Apr. 24, 2017

(65) Prior Publication Data

US 2017/0226909 A1    Aug. 10, 2017

Related U.S. Application Data

(63) Continuation of application No. PCT/EP2015/074639, filed on Oct. 23, 2015.

(30) Foreign Application Priority Data

Oct. 31, 2014  (DE) .................. 10 2014 115 923

(51) Int. Cl.
 *F01N 3/20* (2006.01)
 *F01N 3/027* (2006.01)
 (Continued)

(52) U.S. Cl.
 CPC ........... *F01N 3/2013* (2013.01); *F01N 3/027* (2013.01); *F01N 3/2828* (2013.01); *H05B 3/56* (2013.01);
 (Continued)

(58) Field of Classification Search
 CPC .... F01N 2240/16; F01N 3/0222; F01N 3/027; F01N 3/2013; F01N 3/2828; H05B 2203/004; H05B 3/56
 See application file for complete search history.

(56) References Cited

U.S. PATENT DOCUMENTS 3,912,905 A * 10/1975 Giler ...................... H05B 3/141
 219/461.1
4,160,897 A    7/1979 Makino
 (Continued)

FOREIGN PATENT DOCUMENTS

CN       101268261 A     9/2008
CN       102498269 A     6/2012
 (Continued)

OTHER PUBLICATIONS

International Search Report and Written Opinion dated Jan. 27, 2016 from corresponding International Patent Application No. PCT/EP2015/074639.
(Continued)

*Primary Examiner* — Audrey K Bradley
*Assistant Examiner* — Anthony Ayala Delgado

(57) ABSTRACT

The invention relates to a honeycomb body with an electric heating device. The electric heating device includes at least one electrically insulating heating wire which is fixed by a pin assembly to a front side of a honeycomb body. The electrically insulated heating wire is positioned at a distance of at least five times and a maximum of fifteen times that of the wire diameter.

15 Claims, 2 Drawing Sheets

(51) Int. Cl.
  *F01N 3/28* (2006.01)
  *F01N 3/022* (2006.01)
  *H05B 3/56* (2006.01)

(52) U.S. Cl.
  CPC ........ *F01N 3/0222* (2013.01); *F01N 2240/16* (2013.01); *H05B 2203/004* (2013.01); *Y02T 10/26* (2013.01)

(56) References Cited

U.S. PATENT DOCUMENTS

| | | | | |
|---|---|---|---|---|
| 4,427,418 A | * | 1/1984 | Kogiso | F01N 3/027 422/178 |
| 4,512,786 A | | 4/1985 | Sakurai et al. | |
| 4,523,935 A | * | 6/1985 | Takagi | B01D 39/2093 219/205 |
| 4,548,625 A | * | 10/1985 | Ishida | F01N 3/027 422/178 |
| 4,549,398 A | * | 10/1985 | Oishi | F01N 3/022 219/539 |
| 4,948,403 A | * | 8/1990 | Lepperhoff | F01N 3/027 55/282 |
| 5,053,603 A | * | 10/1991 | Wagner | F01N 3/027 219/205 |
| 5,567,392 A | * | 10/1996 | Becker | B01D 53/9481 422/174 |
| 5,582,805 A | | 12/1996 | Yoshizaki et al. | |
| 8,940,072 B2 | * | 1/2015 | Boulet | B01D 53/0462 422/169 |
| 2004/0221572 A1 | * | 11/2004 | Treiber | B01D 46/0063 60/297 |
| 2006/0177358 A1 | | 8/2006 | Lee | |
| 2014/0165541 A1 | * | 6/2014 | Nagel | F01N 3/2026 60/300 |
| 2014/0290229 A1 | * | 10/2014 | Hirth | F01N 3/2026 60/320 |

FOREIGN PATENT DOCUMENTS

| | | |
|---|---|---|
| CN | 103806986 A | 5/2014 |
| DE | 102013222490 A1 | 5/2014 |
| EP | 0783621 A1 | 7/1997 |
| WO | 2013064373 A1 | 5/2013 |

OTHER PUBLICATIONS

German Patent Office Search Report dated Jul. 6, 2015 from corresponding German patent application No. 10 2014 115 923.3.

* cited by examiner

HONEYCOMB BODY WITH AN ELECTRIC HEATING DEVICE

CROSS-REFERENCE TO RELATED APPLICATIONS

This application claims the benefit of PCT Application PCT/EP2015/074639, filed Oct. 23, 2015, which claims priority to German Application DE 10 2014 115 923.3, filed Oct. 31, 2014. The disclosures of the above applications are incorporated herein by reference.

FIELD OF THE INVENTION

The present invention relates to a honeycomb body arrangement having an electric heating device. Honeycomb body arrangements of this kind are used, in particular, in exhaust gas aftertreatment systems in motor vehicles, in particular in order to achieve targeted temperature management there.

BACKGROUND OF THE INVENTION

In order to limit the emission of pollutants from internal combustion engines, especially in motor vehicles, catalytic converters and/or particulate filters or the like have long been used for cleaning the exhaust gas. To ensure that catalytically assisted conversion of the pollutants takes place, the exhaust gas and/or the catalytic converter or the particulate filter must be at a predetermined minimum temperature. Particularly after a cold start or a restart of the internal combustion engine, such a minimum temperature has often not yet been achieved. An attempt is therefore made to increase the temperature of the exhaust gas and/or of the catalytic converter or particulate filter by means of electrically operated heating elements.

Thus, EP-B1-0783621, for example, discloses an electrically heatable catalyst which is constructed with two honeycomb bodies. Here, the first honeycomb body is connected to an electric voltage source and may carry a flow of current. Owing to the ohmic resistance heating, there is then significant heating of the metal foils of the first honeycomb body, wherein the catalytic coating of the first honeycomb body, the coating being in contact with the foils, and/or the exhaust gas flowing through the first honeycomb body is/are heated. For reasons connected with stability, provision is furthermore made for this first honeycomb body to be supported against a downstream second honeycomb body by means of pins and holding elements. Such an embodiment of an electrically heatable catalyst has already proven very useful but still requires a relatively high outlay in production.

Moreover, WO-A1-2013064373 has disclosed an exhaust gas aftertreatment device in which a honeycomb body is provided, on the outlet side of which a receptacle for a heating element is provided. This heating element is formed, in particular, by an electrical conductor, which is surrounded by an insulator. This heating element is formed in the receptacle and is connected to at least one metal layer of the honeycomb body, thus ensuring that the heating element is held captive in the honeycomb body. Such an embodiment of the exhaust gas treatment device makes it simple to produce and to heat electrically. In this case, the heating element is incorporated during the process of producing the exhaust gas aftertreatment device, but it is also possible to incorporate the heating element into the honeycomb body after the production of the body. However, this concept has the effect that selective machining of the metal layers of the honeycomb body is required and that the exhaust gas is heated only a short time before exiting from the honeycomb body through contact with the heating element.

In motor vehicles, a predetermined energy or voltage is often only available at certain times. In many cases, therefore, it was previously only possible to operate such electric heating elements at 12 volts or a maximum of 24 volts. Now, however, there is the possibility of onboard electrical systems being able to deliver up to 48 volts. To achieve adequate ohmic resistance heating in this case, the electric heating element must form a relatively high electrical resistance. In this context, there is a preference for embodiments of the heating elements which provide an electrical resistance in a range of from 0.5 to 5 ohms. The application or use of 48 V energy systems or onboard electrical systems poses new challenges to the design of the electric heating elements and the incorporation thereof into exhaust gas aftertreatment systems. On the one hand, this concerns the operation or arrangement of such electric heating elements in the exhaust gas aftertreatment system and, on the other hand, the manufacture of corresponding honeycomb body arrangements, which should be embodied in a simple manner in view of costs and assembly.

Corrosion has proven problematic in connection with the use of high-voltage heating elements (e.g. 24 volts or especially 48 volts). Thus, for example, it has been found that the corrosive loss of the materials for the heating conductor (e.g. the metal foils of an electrically heatable honeycomb body) increases with rising voltage. Thus, it has been found that this corrosive loss of a range of materials rises by a significant factor F when operating with a 48-volt network as compared with a conventional 12-volt network, wherein F is at least 3, at least 5 or even at least 8 (determined in a corrosive environment, namely with NaCl wetting). Consequently, there is a considerable requirement for adaptation with a view to long-term operation of such heating elements in this environment.

SUMMARY OF THE INVENTION

It is therefore an object of the present invention to at least partially solve the problems explained with reference to the prior art. In particular, the intention is to specify a honeycomb body arrangement by means of which it is possible, on the one hand, to achieve selective temperature management in respect of the exhaust gas aftertreatment system but which, at the same time, also operates in a particularly effective manner and in the context of a 48-volt onboard electrical system. Moreover, the honeycomb body arrangement should allow controlled current flow or any desired temperature profile under various ambient conditions in the exhaust gas aftertreatment system, especially while taking into account the thermal expansion behavior due to temperature fluctuations and/or pressure pulses in the exhaust gas aftertreatment system. Another focus is to propose a honeycomb body arrangement which allows relatively simple assembly. Moreover, the honeycomb body arrangement should cause relatively low pressure losses when there is a flow of exhaust gas through this honeycomb body arrangement having an electric heating device. It is furthermore desirable that it should be possible to extend the area of influence of the electric heating not only to the exhaust gas flow but also to the honeycomb body having the catalytically active coating.

These objects are achieved by means of a honeycomb body arrangement having an electric heating device in accordance with the features of patent claim 1. Further advantageous embodiments of the invention are presented in the dependent patent claims. It should be noted that the features presented individually in the patent claims may be combined in any technologically feasible manner and give rise to further embodiments of the invention. The description, in particular also in conjunction with the figures, explains these features and indicates further possible combinations, which likewise form variant embodiments of the invention.

In the honeycomb body arrangement proposed here having an electric heating device, it is envisaged that the electric heating device comprises at least one electrically insulated heating wire having a wire diameter. This heating wire is fixed by means of a pin arrangement to a front side of a honeycomb body at a distance of at least five times and a maximum of fifteen times the wire diameter.

As regards the electric heating device, it should be noted that this is, in particular, configured and set up in such a way that it is operated using a 48-volt network. The heating device may comprise one or more heating wires, which may be interconnected electrically in series and/or parallel. In particular, the at least one heating wire has an electrically conductive wire core, which is in contact, on the one hand, with a voltage source and, on the other hand, with an electric ground. Moreover, this wire core is (fully) electrically insulated from the outside, with the result, in particular, that direct electrical contact with regions other than the connection electrodes, in particular an adjoining housing of the honeycomb body arrangement, the pin arrangement and/or the honeycomb body, is prevented. A material comprising nickel and chromium is suitable for the wire core. The wire insulation surrounding the wire core is formed, for example, from powdered, highly compacted mineral oxide, e.g. aluminum oxide or magnesium oxide. Accordingly, the heating wire is preferably embodied in the manner of a "coaxial cable", with an inner electrically conductive wire core and an externally surrounding wire insulation. This wire insulation, in particular, also serves to minimize significantly the corrosive loss described at the outset. Moreover, it is helpful for the heating wire additionally to be embodied with a wire sheath, which is, in turn, made of metal. Such an embodiment of the heating wire has the effect that the heat which arises in the wire core owing to the ohmic resistance heating is dissipated quickly and completely to the metallic wire sheath, wherein, from there, heat conduction may take place in an effective manner through direct contact with the exhaust gas and/or the pin arrangement. In view of the area of application of the honeycomb body arrangement, a wire sheath that is resistant to high temperatures and corrosion is preferred, e.g. a steel (such as Inconel® 600).

In many applications, the wire core will have a wire core cross section of uniform character along its length. However, it is possible for the wire core cross section to vary along its length, e.g. to be reduced, in order to achieve a predetermined increased heating capacity in predetermined segments.

The heating wire also has a wire diameter (defined by the outer wall), by means of which the spatial extent of the heating wire itself may essentially be characterized.

Intensive studies have shown that the use of an electrically insulated heating wire of this kind upstream of a honeycomb body provides very good opportunities for selective temperature management, precisely in combination with a 48-volt network, if a corresponding heating device is positioned at a distance from the honeycomb body, in which (catalytic) conversion of pollutants then takes place at a predetermined or known or set minimum temperature.

In respect of the above-stated aims too, it has been found that this electric heating device should then be positioned by means of a pin arrangement on a front side of the honeycomb body at the predetermined distance of at least five times and a maximum of fifteen times the (mean) wire diameter. In other words, this means that the exhaust gas initially flows through the electric heating device having the at least one electrically insulated heating wire and then moves onward (only) along the pin arrangement before finally entering the honeycomb body. In particular, it has been found that there is an unfavorable inflow behavior of the exhaust gas on the front side of the honeycomb body if the distance falls below five times the wire diameter. Moreover, soot bridges which settle there may burn off and, in the long term, may lead to damage to the honeycomb body arrangement. If the distance is increased to such an extent that the factor of fifteen times the wire diameter is exceeded, the honeycomb body arrangement may tend toward unwanted oscillation and/or vibration, thereby likewise impairing the durability of the honeycomb body arrangement. The range indicated here for the distance, of five times to fifteen times the wire diameter, furthermore allows an adequate relative movement between the heating device and the honeycomb body as a result of the changing ambient conditions in an exhaust gas aftertreatment system. Very particularly and preferably, this distance is chosen so as to be in a range of from eight times to thirteen times the wire diameter.

The pin arrangement comprises, in particular, a multiplicity of separate pins, which fix the at least one electrically insulated heating wire at the predetermined distance and are themselves furthermore (only) in contact with the downstream honeycomb body or are secured there. In particular, the pin arrangement is furthermore configured in such a way that they allow heat conduction from the heating device or the heating wire toward the honeycomb body. Accordingly, the pin arrangement or the pins are at least partially filled with heat conducting material, in particular in the region of contact of the pin arrangement with the heating wire.

As a particular preference, the electric heating device comprises a single heating wire, which is arranged in such a way that it forms a heating disk, which is fixed at a uniform distance from the front side of the honeycomb body. In this case, the single heating wire is arranged in a meandering shape, a spiral shape or the like and/or substantially in a plane, preferably in a uniformly distributed manner. In this case, the single heating wire covers a partial area and/or the totality of the front face of the downstream honeycomb body and thus forms a kind of disk. It is clear that the heating wire is preferably laid in such a way that there are still sufficient interspaces between the heating wire loops, through which the exhaust gas may pass. It is preferred if between 20% and 60% of the desired covered area of the front side of the honeycomb body is covered by the electric heating wire. The interspaces or the degree of coverage should be chosen taking into account the maximum permitted or desired pressure drop across the honeycomb body arrangement, something that is no problem for a person skilled in this area of the prior art. Even if it is possible, in principle, to fix the heating disk obliquely to the front side of the honeycomb body, with the result that the abovementioned distance is at any rate also achieved at the narrow point, it is preferred if a substantially parallel arrangement of the heating disk in relation to the front face of the honeycomb body is implemented. If, for example, the front side of the honeycomb body is also positioned obliquely to the flow direction of the exhaust gas, then it is likewise preferred that the heating disk should likewise be aligned obliquely to the flow direction of the exhaust gas at a uniform distance over the entire front side. In principle, it is also possible for a plurality of heating disks, each formed by a single heating wire, to be arranged in series in the flow direction of the exhaust gas and to be fixed by means of a pin arrangement (in particular a single pin arrangement) at a uniform distance from the front side of the honeycomb body in each case.

It is furthermore proposed that the pin arrangement comprises a multiplicity of separate pins, which extend into cavities starting from the front side of the honeycomb body and are secured there. As a very particular preference, the pin arrangement is formed exclusively of a multiplicity of separate pins. The term "pin" used here should be interpreted broadly and is intended essentially to express the fact that an elongate element is present, which spans the distance mentioned at the outset and accordingly has opposite end regions which may interact, on the one hand, with the heating wire and, on the other hand, with the cavities of the honeycomb body. The specific embodiment of the end regions of the pins are of a character oriented to the application, e.g. in cylinder form, in cone form, with a hook, with an eye, with a stop, with a chamfer and the like. In principle, it is not necessary for each pin to enter cavities in the honeycomb body. For example, it is possible, where the honeycomb body is embodied as a particulate filter with alternately closed channels (plugs), for some of the pins to extend into the channels and others to extend into the plugs and/or the channel wall. It is also possible, for example, for the cavities to be formed in the manner of continuous and/or successively closed channels, folds, pockets etc. The pins are secured in the cavities, in particular, by means of material engagement (material-material joint), in particular by a brazed joint, a sintered joint, a diffusion joint, a welded joint or the like. The number of pins, in turn, should be chosen taking into account the specific embodiment of the heating device, of the honeycomb body and/or of the exhaust gas aftertreatment system. Normally, the number of pins will be at least ten, in particular at least twenty or at least thirty.

As a very particular preference, the pin arrangement is metallic. On the one hand, this may mean that the pin arrangement has metallic partial areas, but it is preferred that the pin arrangement (or the separate pins) are made completely (exclusively) of metal. The metallic configuration of the pin arrangement makes possible, in particular, efficient heat conduction from the electric heating device or the heating wire toward the honeycomb body and/or the exhaust gas flowing along it. This applies particularly when the heating wire is embodied with a metallic wire sheath. Precisely this configuration is also preferred because in this way simple connection between the wire sheath and the pin arrangement or the pin is made possible, once again preferably by means of material engagement (material-material joint). In this case too, the metal to be chosen in respect of the pin arrangement should be one which may withstand high temperatures and the corrosive environment in the exhaust gas aftertreatment system over a long period.

Moreover, it is regarded as advantageous that the at least one heating wire has an oval wire cross section. With such a configuration of the heating wire, a different flow resistance is produced when the heating wire is subject to an incident flow of exhaust gas, depending on whether the exhaust gas flow impinges on the larger wire diameter or the smaller wire diameter of the oval wire cross section. To this extent, it is particularly preferred that the heating wire is arranged in the honeycomb body arrangement in such a way that a minimum possible flow resistance is produced, i.e. the smallest wire diameter of the oval wire cross section faces the flow. In this way, it is possible to provide a wire cross section which is simultaneously of relatively large area for the production of the desired electrical resistance without excessively hindering the flow through the heating device or the honeycomb body arrangement. As a very particular preference, the ratio of the maximum diameter to the minimum diameter of the oval wire cross section is 5:1 or higher. As regards the specification of the shape that, in this case, an "oval" wire cross section is present, the production of a heating wire of this kind is taken into account, in particular. The diameter ratios indicated here may of course equally well be achieved with different wire cross-sectional shapes, e.g. a rectangular shape etc.

Furthermore, a honeycomb body arrangement is regarded is advantageous in which the pin arrangement has a multiplicity of pin passages, through which the at least one heating wire is passed. In this case, at least a proportion or even the totality of the pins is, in particular, embodied with pin passages (e.g. in the form of an eye, a loop, a hole etc.), allowing the heating wire to be passed through there. It is furthermore preferred that there should be not only pure guidance of the heating wire in the pin passages but that there should simultaneously be a permanent connection between the pin arrangement and the heating wire there.

In principle, the electric heating device may have two opposite electrodes. This offers the advantage that the opposite electrodes equally support a stable arrangement of the electric heating device or heating wire. Moreover, a directional current flow is generated.

A common housing may be provided for the honeycomb body arrangement, in which housing the electric heating device and the honeycomb body are arranged. It is possible, in particular, to achieve a stable and protected honeycomb body arrangement with an electric heating device of this kind by means of the common housing and optionally the (opposite) electrodes secured thereon. In particular, the pin arrangement also serves to prevent electric current being carried toward the housing.

In principle, it is also possible to provide a plurality of heating devices having separately controllable power supply units. This plurality of heating devices respectively spans one segment of the front side of the honeycomb body, for example, and/or forms penetrating heating loops which each extend over the entire front face of the honeycomb body. In this case, the heating device is embodied with different heating wires, for example, and/or may be operated at different voltages or currents (simultaneously and/or in temporal succession). Thus, it is possible, in particular, to achieve different heat outputs of the heating device simply by switching on or switching off heating devices.

The invention is employed particularly in a motor vehicle having an exhaust gas aftertreatment system, a power supply unit, a honeycomb body arrangement having an electric heating device of the design proposed here and a control unit, wherein the control unit is connected to the power supply unit and to the honeycomb body arrangement. In particular, the control unit is designed to bring the electric heating device into contact with the power supply unit as required, making it possible to achieve a selective flow of current through the electric heating device in order to achieve particular temperature conditions in the exhaust gas aftertreatment system (the exhaust gas and/or the honeycomb body and/or downstream exhaust gas aftertreatment units, such as catalytic converters, particulate filters, absorbers etc.). It is likewise envisaged here that at least the honeycomb body incorporated into the honeycomb body arrangement has a catalytically active coating (e.g. an oxidation catalyst).

The honeycomb body is preferably formed by at least one metallic layer, in particular an at least partially structured layer. In particular, the metallic layer is embodied as a metal layer (e.g. as a foil, optionally with microstructures, guide vanes, openings, slots, corrugated structure etc.), as a nonwoven (e.g. with a chaotic arrangement of wire filaments) and/or as a grid or woven structure (e.g. likewise composed of wires). Here, the metal is resistant to high temperatures and corrosion and therefore suitable for withstanding the conditions in an exhaust gas aftertreatment system over the long term.

In particular, provision is made here for the power supply unit to be part of a 48-volt network and to make available power accordingly.

The invention and the associated technical field are explained in greater detail below by means of the figures. It should be noted that particularly preferred variant embodiments are shown in the figures but these are not intended to restrict the invention described here.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the figures, identical components are generally provided with the same reference signs. However, it should be noted that the respectively depicted design forms of the components or the interaction thereof in one figure do not have to be interpreted as necessarily belonging together. On the contrary, it is possible to combine components and/or functions from one figure with components and/or functions of at least one other figure.

It is likewise also possible to extract partial aspects or individual components from the figures and to consider them in isolation. It is only if explicitly stated otherwise hereinbelow that this does not apply.

Figure 1:
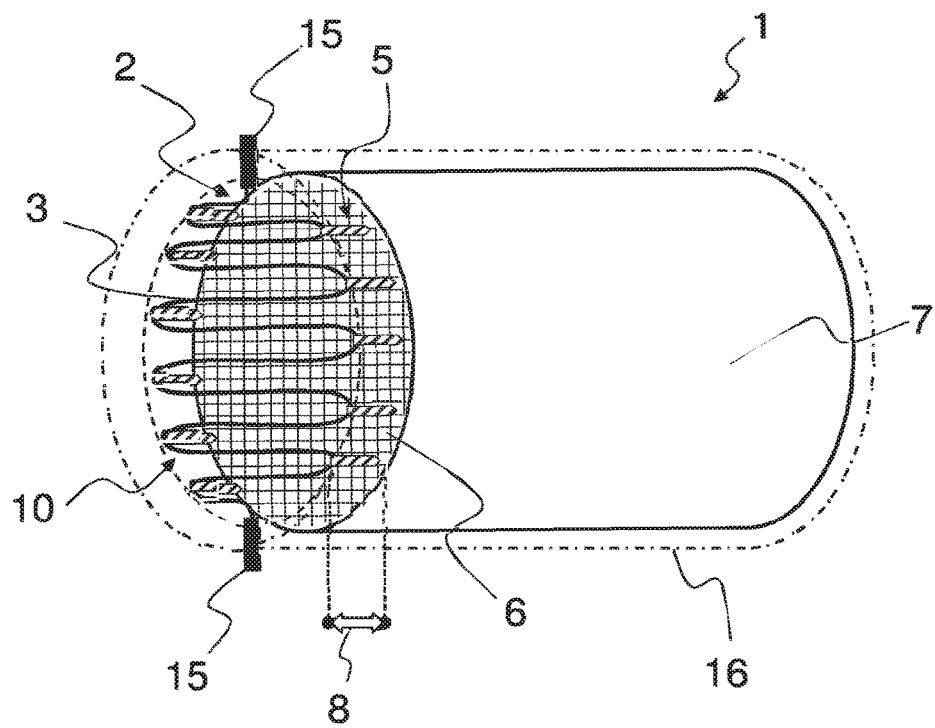
FIG. 1 is a perspective view of a honeycomb body arrangement, according to embodiments of the present invention.

FIG. 1 shows a honeycomb body arrangement 1 having an externally indicated housing 16, which usually also forms the external boundary of the line 26 through which the exhaust gas may flow. A honeycomb body 7 with its front side 6 is shown on the right (or downstream). The exhaust gas usually enters the honeycomb body 7 via the front side 6. The honeycomb body 7 is supplied with at least one at least partially structured metallic layer, with a metallic nonwoven, with a woven structure, with a grid and/or from an extruded material. By means of a pin arrangement 5, the electric heating device 2 is positioned at a predetermined distance 8 and supported against the front side 6. The heating device 2 shown here is designed in the manner of a heating disk 10 with a uniform distance 8 over the entire front side 6 of the honeycomb body 7. In the case shown here, the heating device 2 is fitted with a single heating wire 3, which spans the front side 6 of the honeycomb body 7 (completely) in a meandering shape. Here, two electrodes 15 are provided opposite one another to enable the current to be passed in and out through the housing 16 (in an electrically insulated manner). Via these electrodes 15, the heating wire 3 is connected, for example, to a power supply unit (not shown here) or the electric ground.

Figure 2:
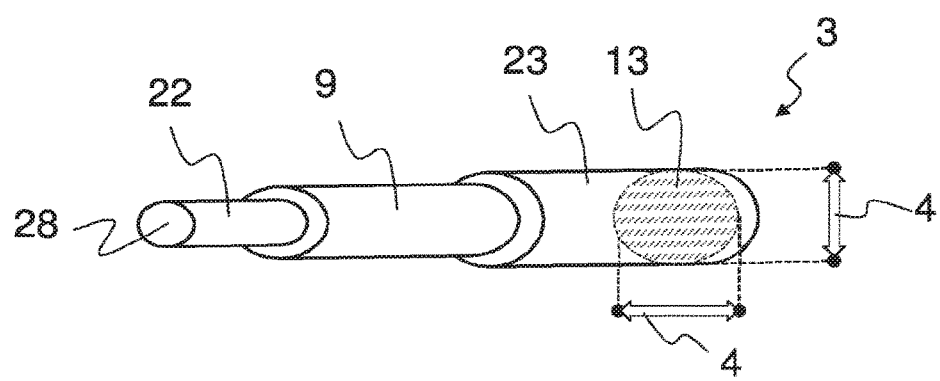
FIG. 2 is a perspective view of an alternate embodiment of a heating wire used as part of a honeycomb body assembly, according to embodiments of the present invention.

FIG. 2 shows a preferred variant of a heating wire 3, which is embodied in the manner of a coaxial cable. Provided in the middle or centrally in this variant is the electrically conducting wire core 22, which forms a wire core cross section 28. The wire insulation 9 is provided in such a way as to surround this wire core 22 coaxially in the manner of a hollow cylinder. A metallic wire sheath 23 is provided over the sheath and completely surrounding it, once again coaxially. This construction is preferably implemented fully between the two electrodes of the heating device. It is likewise apparent from FIG. 2 that the (outer) wire cross section is of oval design and thus forms a maximum and a minimum wire diameter 4.

Figure 3:
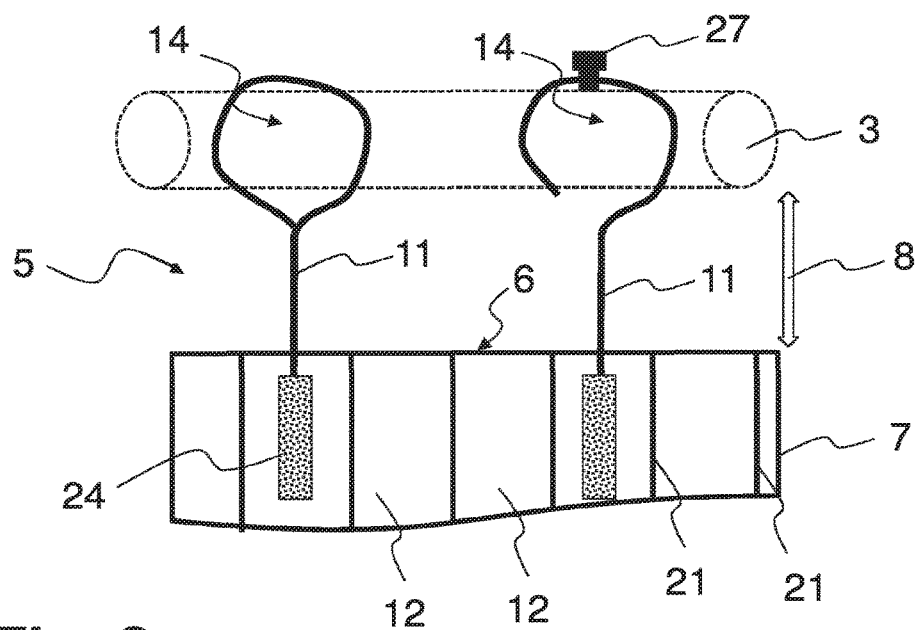
FIG. 3 is a diagram of a pin arrangement used as part of a honeycomb body assembly, according to embodiments of the present invention.

FIG. 3 shows a detail of a variant embodiment of a pin arrangement 5, wherein two different pins 11 are illustrated here by way of example, although this is not absolutely necessary in a pin arrangement 5. The end region of the pins 11, which is illustrated at the bottom here, is positioned in such a way that the pins 11 are secured in the honeycomb body 7, namely projecting into cavities 12 starting from the front side 6. For this purpose, use is made, in particular, of a joint 24, e.g. by means of a brazing material, especially if the pins 11 and the honeycomb body 7 are of metallic design in the region. To ensure that the heating wire 3 indicated here is now fixed permanently at the predetermined distance 8 from the front side 6 of the honeycomb body 7, the pins 11 have pin passages 14, in which the heating wire 3 is guided or held. In the left-hand configuration of the pin 11, the pin passage 14 is provided in the form of a (closed) eye, while the pin 11 illustrated on the right forms a pin passage 14 in the form of a hook or a loop, in which the heating wire 3 is received. The fixing of the heating wire 3 relative to the pins 11 is also achieved by means of a separate clamping element 27 (here in the form of a clamping screw, for example). However, a material joint between the (metallic) pin 11 and the (externally metallic) heating wire 3 is preferable under some circumstances.

Merely for the sake of completeness, it may be noted that it is not a complete section of the honeycomb body 7 which is shown here but only a partial region close to the front side 6. Here, the cavities 12 are formed, in particular, by metal layers 21, e.g. in the form of structured and/or smooth metal foils.

Figure 4:
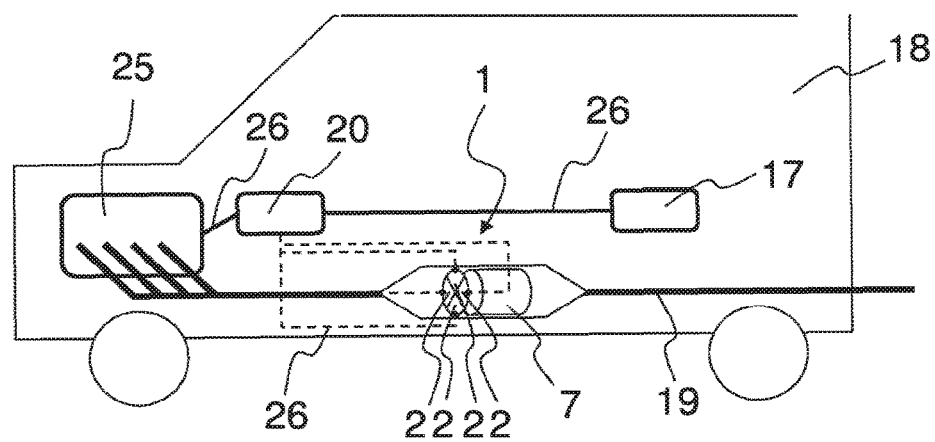
FIG. 4 is a diagram of a motor vehicle having an exhaust gas aftertreatment system which incorporates a honey comb body arrangement, according to embodiments of the present invention.

To illustrate the area of application, a motor vehicle 18 is furthermore shown in FIG. 4, the vehicle comprising an internal combustion engine 25 and a downstream exhaust gas aftertreatment system 19. The honeycomb body arrangement 1 proposed here, having a plurality of electric heating devices 2, is incorporated into this exhaust gas aftertreatment system 19, wherein the heating devices are once again supported against a downstream honeycomb body 7. The motor vehicle 18 furthermore has a control unit 20, by means of which power may be fed from a power supply unit 17 to the plurality of electric heating devices 2 as required, optionally on the basis of measured values and/or operating modes of the internal combustion engine 25.

In particular, the concept proposed here of a honeycomb body arrangement having an electric heating device allows incorporation into a 48V onboard electrical system of a motor vehicle, according to which an electrical resistance in a range of from 0.5-5 ohms is provided by the at least one heating wire. Precisely in the case of a heating wire of coaxial construction with an external metallic wire sheath, the pin arrangement is soldered directly to the heating wire, thereby simplifying production. Moreover, this concept allows heat input by heat conduction to the (coated) honeycomb body, thus making possible a rapid start of conversion. In particular, it is thereby also possible to set particularly low heat outputs (by virtue of the relatively high electrical resistance).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A honeycomb body arrangement, comprising:
   an electric heating device;
   at least one electrically insulated heating wire having a wire diameter, the at least one electrically insulated heating wire being part of the electric heating device;
   a pin arrangement; and
   a honeycomb body having a front side;
   wherein the at least one electrically insulated heating wire is connected to the front side of the honeycomb body by the pin arrangement, such that the at least one electrically insulated heating wire is located at a predetermined distance from the front side of the honeycomb body, and the distance between the at least one electrically insulated heating wire and the honeycomb body is at least five times greater than the wire diameter.

2. The honeycomb body arrangement of claim 1, the electric heating device further comprising:
   a single heating wire; and
   a heating disk formed by the configuration of the single heating wire;
   wherein the heating disk is fixed at a uniform distance from the front side of the honeycomb body.

3. The honeycomb body arrangement of claim 1, further comprising:
   a plurality of pins, the plurality of pins being part of the pin arrangement; and
   a plurality of cavities formed as part of the honeycomb body;
   wherein each of the plurality of pins extends and is secured into a corresponding one of the plurality of cavities in the front side of the honeycomb body.

4. The honeycomb body arrangement of claim 1, wherein the pin arrangement is metallic.

5. The honeycomb body arrangement of claim 1, the at least one electrically insulated heating wire further comprising an oval wire cross section.

6. The honeycomb body arrangement of claim 1, the pin arrangement further comprising a plurality of pin passages, wherein the at least one electrically insulated heating wire extends through at least one of the plurality of pin passages.

7. The honeycomb body arrangement of claim 1, the electric heating device further comprising two electrodes, each electrode connected to an end of the at least one electrically insulated heating wire.

8. The honeycomb body arrangement of claim 1, further comprising a housing, wherein the electric heating device and the honeycomb body are arranged in the housing.

9. The honeycomb body arrangement of claim 1, further comprising:
   a plurality of heating devices; and
   a plurality of controllable power supply units;
   wherein one of the controllable power supply units supplies power to a corresponding one of the plurality of heating devices.

10. The honeycomb body arrangement of claim 1, wherein the distance between the at least one electrically insulated heating wire and the honeycomb body is a maximum of fifteen times greater than the wire diameter.

11. A motor vehicle having an exhaust gas aftertreatment system, comprising:
    a honeycomb body arrangement;
    an electric heating device being part of the honeycomb body arrangement;
    at least one electrically insulated heating wire having a wire diameter, the at least one electrically insulated heating wire being part of the electric heating device;
    a pin arrangement;
    a honeycomb body being part of the honeycomb body arrangement, the honeycomb body arrangement having a front side, the at least one electrically insulated heating wire being connected to the front side of the honeycomb body by the pin arrangement, such that the at least one electrically insulated heating wire is located at a predetermined distance from the front side of the honeycomb body; and
    wherein the distance between the at least one electrically insulated heating wire and the honeycomb body arrangement is at least five times greater than the wire diameter.

12. The motor vehicle having an exhaust gas aftertreatment system of claim 11, further comprising:
    at least one electrically insulated heating wire having a wire diameter, the at least one electrically insulated heating wire being part of the electric heating device;
    a heating disk formed by the configuration of the at least one electrically insulated heating wire; and
    a honeycomb body having a front side;
    wherein the heating disk is fixed at a uniform distance from the front side of the honeycomb body.

13. The honeycomb motor vehicle having an exhaust gas aftertreatment system of claim 12, wherein the distance between the at least one electrically insulated heating wire and the honeycomb body arrangement is a maximum of fifteen times greater than the wire diameter.

14. The motor vehicle having an exhaust gas aftertreatment system of claim 12, further comprising:
    a pin arrangement; and
    a plurality of pins, the plurality of pins being part of the pin arrangement;
    a plurality of cavities formed as part of the honeycomb body;
    wherein each of the plurality of pins extends and is secured into a corresponding one of the plurality of cavities in the front side of the honeycomb body.

15. The honeycomb motor vehicle having an exhaust gas aftertreatment system of claim 14, the pin arrangement further comprising a plurality of pin passages, wherein the at least one electrically insulated heating wire extends through at least one of the plurality of pin passages.

\* \* \* \* \*